United States Patent [19]
Ito et al.

[11] Patent Number: 5,422,175
[45] Date of Patent: Jun. 6, 1995

[54] VOID-CONTAINING COMPOSITE FILM OF POLYESTER TYPE

[75] Inventors: Katsuya Ito; Atsushi Taga; Katsufumi Kumano; Yasushi Sasaki; Toshitake Suzuki; Akito Hamano, all of Otsu, Japan

[73] Assignee: Toyo Boseki Kabushiki Kaisha, Osaka, Japan

[21] Appl. No.: 67,813

[22] Filed: May 27, 1993

[30] Foreign Application Priority Data

Jun. 1, 1992 [JP] Japan ................... 4-140510
Jun. 1, 1992 [JP] Japan ................... 4-140511

[51] Int. Cl.⁶ ............................................. B32B 3/26
[52] U.S. Cl. ................... 428/304.4; 428/206; 428/318.4; 428/319.3; 428/480; 428/483
[58] Field of Search ............... 428/143, 480, 319, 355, 428/304.4, 318.4, 319.3, 206, 304.4, 318.4, 483; 521/134, 138

[56] References Cited

U.S. PATENT DOCUMENTS

| | | | |
|---|---|---|---|
| 5,051,292 | 9/1991 | Katoh et al. | 428/141 |
| 5,084,334 | 1/1992 | Hammano et al. | 428/304.4 |
| 5,204,418 | 4/1993 | Yasue et al. | 525/445 |

FOREIGN PATENT DOCUMENTS 04149250 10/1990 Japan .
04153232 10/1990 Japan .
04202540 11/1990 Japan .

*Primary Examiner*—Patrick J. Ryan
*Assistant Examiner*—William A. Krynski
*Attorney, Agent, or Firm*—Foley & Lardner

[57] ABSTRACT

A void-containing composite film including (A) a polyester base layer containing voids composed mainly of a polymer mixture of a polyester and a thermoplastic resin which is not compatible with the polyester and is selected from the group of polystyrene resins, polyolefin resins, polyacrylic resins, polycarbonate resins, polysulfone resins, cellulose resins, polysiloxane resins and silicone resins, and (B) at least one outer surface layer composed mainly of polyethylene terephthalate and formed on at least one side of the polyester base layer (A), the polyester base layer (A) and the at least one outer surface layer (B) being formed into a composite film by co-extrusion, followed by orientation in at least one direction, the void percentage of a surface portion having 3 μm thickness from the surface of the polyester base layer (A) is 8% by volume or less, the average void percentage of the composite film is 10% to 50% by volume, and the composite film has substantially no voids at the interface between the polyester base layer (A) and the outer surface layer (B).

28 Claims, 2 Drawing Sheets

VOID-CONTAINING COMPOSITE FILM OF POLYESTER TYPE

FIELD OF THE INVENTION

The present invention relates to a polyester-type film containing a large number of fine voids and thus having sufficient toughness and excellent printability for use as labels, posters, recording paper, wrapping paper and the like.

BACKGROUND OF THE INVENTION

Synthetic paper as a substitute for paper, composed mainly of synthetic resins, has excellent properties as compared with paper composed of natural materials, i.e., natural paper, such as water resistance, dimensional stability to moisture absorption, surface stability, glossiness and definition for printing, and mechanical strength. In recent years, practical uses of synthetic paper have been developed by making good use of these advantages.

As the main raw material of synthetic paper, there are used synthetic resins such as polyethylene, polypropylene and polyesters. Among these, polyesters such as polyethylene terephthalate are excellent in the properties such as high thermal resistance and high toughness, so that they can find wide applications.

The following processes have been proposed for production of a polyester film having similar functions to those of paper by using a polyester as the main raw material:

(1) treatment for allowing the inside of a polyester film to contain a large number of fine voids, i.e., preparation of a void-containing polyester film; and (2) treatment for making rough the surface of a conventional flat polyester film by a technique such as (2—1) sandblasting, (2—2) chemical etching or (2—3) matting (i.e., technique for laminating a matting agent together with a binder).

Among these processes, the process (1) has some advantages in that the film can save its own weight and can be given suitable softness for distinct printing and transfer.

In order to form fine voids in the inside of a polyester film, there has hitherto been proposed a process comprising the steps of: melt-kneading in an extruder, a mixture of a polyester and a polymer which is not compatible with this polyester; extruding the kneaded material into a sheet in which fine particles of the polymer are dispersed in the polyester film base material; and then drawing the sheet to form fine voids around the fine particles (see, e.g., U.S. Pat. No. 5,084,334).

As the polymer which is not compatible with the polyester (hereinafter referred to as incompatible resin), which can be used for the formation of fine voids, there have been proposed numerous resins such as polyolefin resins (see, e.g., Japanese Patent Laid-open Publication No. 134755/1974), polystyrene resins (see, e.g., Japanese Patent Publications Nos. 2016/1974 and 29550/1979) and polyacrylate resins (see, e.g., Japanese Patent Publication No. 28097/1983). Among these resins, polypropylene and polystyrene are particularly preferred, because fine voids can be easily formed by using these resins, and these resins have low density and are available at low cost.

These conventional polyester films, however, have disadvantages in that (1) when provided with an adhesive layer on the surface thereof and used as a label or the like, followed by peeling off, the fine voids present near the film surface act as cracks, so that the surface portion of the film is broken away; (2) they have strong glossiness on the surface thereof, which gives poor appearance for a paper substitute; and (3) the whiteness of the film is decreased by deterioration of the polyester caused by exposure to ultraviolet light or by deterioration arising from by-products of the polyester and the opacifying agent used therein.

SUMMARY OF THE INVENTION

Under these circumstances, the present inventors have intensively studied void-containing films of the polyester type and found that the disadvantages of conventional polyester films as described above can be solved by controlling the size and distribution of fine voids, thereby completing the present invention.

Thus, the present invention provides a composite film of the polyester type having high degree of definition for printing, typing and copying, high durability, high toughness, cushioning properties, and particularly high surface strength, appearance of high quality, and excellent resistance to ultraviolet light; such a composite film is, therefore, suitable as a base material for labels, posters, recording paper, ordinary slips, delivery slips for use in home delivery system, pressure-sensitive paper, copying paper, printing paper for printers and the like.

A void-containing composite film of the polyester type according to the present invention comprises (A) a polyester base layer containing fine voids formed by allowing a polymer mixture of at least one polyester and at least one thermoplastic resin which is not compatible with the polyester to orientate in at least one direction and (B) at least one outer surface layer composed mainly of at least one thermoplastic resin and formed on at least one side of the polyester base layer (A), wherein the void percentage of a surface portion having 3 μm thickness from the surface of the polyester base layer (A) is 8% by volume or less, and the average void percentage of the composite film is 10% to 50% by volume.

Another void-containing composite film of the polyester type according to the present invention comprises (A) a polyester base layer containing fine voids and (B) at least one outer surface layer composed mainly of at least one thermoplastic resin and formed on at least one side of the polyester base layer (A), wherein the outer surface layer (B) contains 1% to 30% by weight of inorganic particles comprising primary particles having an average primary particle size $R_1$ of 0.1 to 2.0 μm and secondary particles having an average secondary particle size $R_2$ which is 1.05 to 1.60 times the value of $R_1$; a particular particle size of the secondary particles giving 99% probability in the normal distribution for the presence of secondary particles smaller than the particular particle size is not greater than 4.0 times the value of $R_1$; and the average value of the shortest distances between the centers of gravity for the inorganic particles is not greater than 5.0 times the value of $R_1$.

BRIEF DESCRIPTION OF THE DRAWINGS

The present invention may be better understood and its numerous objects and advantages will become apparent to those skilled in the art by reference to the accompanying drawings.

DESCRIPTION OF THE PREFERRED EMBODIMENTS

Figure 1:
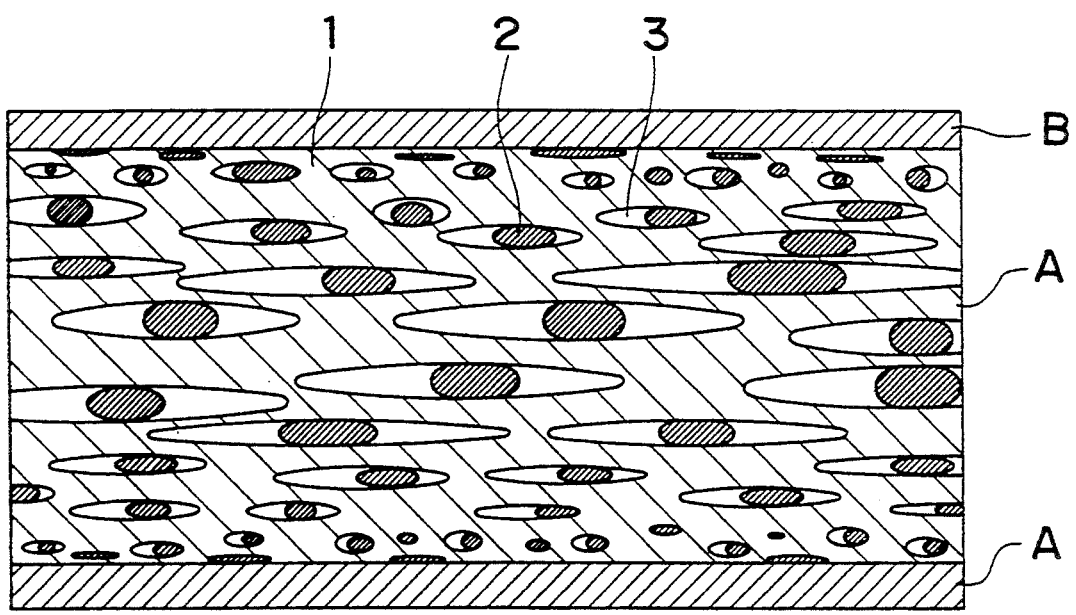
FIG. 1 is a schematic sectional view of a main part of the void-containing composite film of the polyester type, which is obtained according to the present invention, in the direction of its thickness.

FIG. 1 shows a void-containing composite film of the polyester type according to the present invention. The void-containing composite film is composed of the polyester base layer (A) and the outer surface layers (B) formed on both sides thereof. The outer surface layer (B) may be formed on one side of the polyester base layer (A).

As shown in FIG. 1, the polyester base layer (A) has a film base material 1 consisting mainly of the polyester, dispersed fine particles 2 consisting mainly of the thermoplastic resin which is not compatible to the polyester, and fine voids 3 formed around the fine particles 2.

The polyester base layer (A) can be formed by allowing a polymer mixture of at least one polyester and at least one thermoplastic resin which is not compatible with the polyester to orientate in at least one direction. The outer surface layer (B) is composed mainly of at least one thermoplastic resin.

The polyester which can be used in the present invention is a polyester obtained by polycondensation of an aromatic dicarboxylic acid, such as terephthalic acid, isophthalic acid or naphthalenedicarboxylic acid, or an ester thereof, with a glycol such as ethylene glycol, diethylene glycol, 1,4-butanediol or neopentyl glycol. The polyester can be produced by direct reaction of an aromatic dicarboxylic acid with a glycol, or by ester interchange of an alkylester of the aromatic dicaboxylic acid with a glycol, followed by polycondensation, or by polycondensation of a diglycol ester of the aromatic dicarboxylic acid. Typical examples of the polyester are polyethylene terephthalate, polybutylene terephthalate and polyethylene-2,6-naphthalate.

The raw material polyester may be a homopolymer, a copolymer containing any other component, i.e., copolyester, or a mixture of a homopolymer and a copolyester. In cases where high toughness and high tensile strength is to be conferred on the polyester film, it is preferred that a polyester to be used as the raw material contains ethylene terephthalate units, butylene terephthalate units or ethylene-2,6-naphthalate units at a proportion of 70 mol % or greater, preferably 80 mol % or greater, and more preferably 90 mol % or greater. In cases where high softness or easy adhesion is to be conferred on the polyester film, a copolyester is preferably used alone or in combination with a homopolymer. In any case, the type of the raw material polyester, although it is not particularly limited, may be selected, depending upon the application of the resulting composite film.

The thermoplastic resin which can be used in the present invention is to be not compatible with the polyester. Typical examples of the thermoplastic resin are polystyrene-type resins, polyolefin-type resins, polyacrylic-type resins, polycarbonate-type resins, polysulfone-type resins, cellulose-type resins, polysiloxane-type resins -and silicone-type resins. Particularly preferred are polystyrene-type resins and polyolefin-type resins such as polymethylpentene and polypropylene.

The polymer mixture of the polyester and the thermoplastic resin which is not compatible with the polyester can be prepared by a process in which the chips of these reins are mixed and the resin mixture is melt-kneaded in an extruder, followed by extrusion and solidification; a process in which both resins are kneaded in a kneader and the kneaded mixture is further melt-extruded through an extruder, followed by solidification; or a process in which the thermoplastic resin which is not incompatible with the polyester is added to the polyester in the polymerization step of the polyester and is dispersed therein with stirring to form chips which are then melt-extruded and solidified. The resulting polymer sheet after solidification (i.e., non-drawn-sheet) is usually in the state of no or weak orientation. The thermoplastic resin which is not compatible with the polyester is present in various forms dispersed in the polyester film base material, such as spherical, ellipsoidal and thread-like forms.

In particular, to obtain a void-containing composite film of the polyester type in which the polyester base layer (A) contains a few voids in the surface portion thereof and there are substantially no voids at the interface between the polyester base layer (A) and the outer surface layer (B), the dispersed conditions of the incompatible resin particles have a certain distribution in the direction of thickness of the film, preferably such that their particle size is smaller in the surface portion than in the central portion of the polyester base layer (A). Further, it is preferred that the incompatible resin particles have an elongated shape (i.e., flat shape) in the machine direction of the film at the interface between the layers (A) and (B). In this case, the elongation of the incompatible resin particles should be allowed to occur only in close vicinity to the interface between the layers (A) and (B). When the incompatible resin particles are not allowed to have an elongated shape at the interface between the layers (A) and (B), it results in the formation of small voids at the interface, even if the incompatible resin particles have a small particle size, and these small voids are responsible for the occurrence of surface peeling.

To obtain a non-dram sheet containing incompatible resin particles dispersed therein as described above, the conditions for melt extrusion of a resin for the polyester base layer (A) should be appropriately selected. For example, an increase in the shear stress acting on the tube wall of a melt line extending from an extruder to an extruder die, or at the slit of the extruder die, as compared with ordinary cases, makes it possible to attain the dispersion of incompatible resin particles having a small particle size and a flat shape only in the surface portion of the polyester base layer (A). In addition to these conditions, a decrease in the difference of the melting viscosity between the polyester and the incompatible resin in the vicinity of the interface between the layers (A) and (B), as compared with that difference in the central portion of the polyester base layer (A), makes it possible to attain a further increased flatness and thus a flatter shape of the incompatible resin particles in the vicinity of the interface.

In general, polyolefin-type resins and polystyrenetype resins have a less dependence of its viscosity on temperature, as compared with polyester-type resins. If this phenomenon is utilized to adjust the resin temperature lower in the vicinity of the interface between the layers (A) and (B) than in the central portion of the polyester base layer (A), the control of a difference in the relative viscosity can be attained as described above. To adjust the distribution of a resin temperature in such a way, for example, the control with a decrease in temperature may be employed in the course during the resin is allowed to pass through the melt line extending from the extruder to the extruder die or through the extruder die, whereas the control with an increase in temperature is usually employed in conventional melt extrusion.

In a process where a composite film is obtained by co-extrusion, the independent control of resin temperatures in the layers (A) and (B) may be an effective means of obtaining flat-shaped particles of the incompatible resin. More particularly, the outer surface layer (B) is preferably allowed to have a temperature lower than that of the polyester base layer (A), and it is more preferred that a difference in temperature therebetween is in the range of from 5° to 15° C.

The polymer mixture as described above may contain inorganic particles, if necessary, to improve opacifying and painting properties. Examples of the inorganic particles include, but not limited to, those made of titanium dioxide, silicon dioxide, calcium carbonate, barium sulfate, aluminum oxide, kaoline, zeolite, talc and the like. In place of inorganic particles, appropriate organic particles may also be used. The inorganic particles may be contained in either or both of the layers (A) and (B). The amount of inorganic particles in the polyester base layer (A) is preferably in the range of 1% to 20% by weight, whereas the amount of inorganic particles in the outer surface layer (B) is preferably in the range of 0.5% to 30% by weight. In case where the inorganic particles are contained in both of the layers (A) and (B), it makes possible to obtain a void-containing composite film of the polyester type having opacifying and painting properties, as well as poor glossiness and delustered appearance, under the conditions that the average particle size of the inorganic particles in the outer surface layer (B) is greater than that of the inorganic particles in the polyester base layer (A). Further, in this case, if inorganic particles having an average particle size of 0.3 μm or greater are used only in the outer surface layer (B), the content of inorganic particles can be reduced, thereby allowing an improvement of stretchability. It is, therefore, possible to select the stretching conditions so that the formation of voids can readily be attained.

In the outer surface layer (B) of the void-containing composite film of the present invention, at least one kind of particles having a spherical or cubic shape, or having an intermediate shape therebetween, with notched irregularities on the surface thereof, are preferably contained. The addition of particles having such a shape makes it possible to give a polyester composite film having excellent delustered appearance of the surface thereof and excellent surface strength against peeling, while maintaining the softness of the composite film. When particles without notched irregularities on the surface thereof are used, the surface strength of the composite film against peeling becomes poor, even if the particles have a spherical or cubic shape, or having an intermediate shape therebetween. To the contrary, when particles not having a spherical or cubic shape, or not having an intermediate shape therebetween are used, excellent delustered appearance cannot be attained, even if the particles have notched irregularities on the surface thereof. In any case, when particles having a shape which does not meet the above requirements are used, the thickness of the outer surface layer (B) must be increased in order to attain sufficient delustered appearance and sufficient surface strength against peeling, thereby causing a deterioration in the softness of the composite film.

The thicknesses of the layers (A) and (B) are not particularly limited and can take any value. In order to confer appropriate softness on the composite film, the outer surface layer (B) to be formed on at least one side of the polyester base layer (A) preferably has a thickness 1/5 times or less than the total thickness of the composite film. In order to confer sufficient surface strength against peeling on the composite film, the outer surface layer (B) preferably has a thickness of 0.5 μm or greater. In the composite film of the present invention, the action of particles having a spherical or cubic shape, or an intermediate shape therebetween, with notched irregularities on the surface thereof, which are added to the outer surface layer (B), makes it possible to attain sufficient surface strength against peeling, even if the outer surface layer (B) has a smaller thickness. Thus, the thickness of the outer surface layer (B) is preferably 10 μm or less, and more preferably 6 μm or less.

Preferably, the particles having notched irregularities on the surface thereof and an average particle size of 0.3 μm or greater are contained in the outer surface layer (B) at a proportion of 1% by weight or greater in total. When the average particle size is less than 0.3 μm, sufficient delustered appearance cannot be attained. The average particle size has no particular upper limit, but is preferably 6 μm or less, because greater average particle sizes will readily give surface roughness on the composite film. Moreover, when the total amount of particles to be added to the outer surface layer (B), having a shape as described above, is 1% by weight or less, based on the weight of the outer surface layer (B), sufficient delustered appearance cannot be attained. The amount of such particles to be added to the outer surface layer (B) has no particular upper limit, but is preferably 50% by weight or less, and more preferably 30% by weight or less, so as not to deteriorate the surface strength and the softness of the composite film.

The particles to be added to the outer surface layer (B), having a spherical or cubic shape, or an intermediate shape therebetween, with notched irregularities on the surface thereof, are not particularly limited to any composition. Examples of the material constituting these particles include, but are not limited to, silica, kaolinite, talc, calcium carbonate, zeolite, alumina, barium sulfate, carbon black, zinc oxide, titanium oxide and the like. As the particles having a shape as described above, preferred are synthetic zeolite particles, secondary aggregates of silica microbeads, secondary aggregates of calcium carbonate fine particles and secondary aggregates of titanium oxide fine particles, with synthetic zeolite particles being most preferred.

In case of synthetic zeolite particles, they may be either heat-treated or heat-untreated articles, but it is preferred to use synthetic zeolite particles which have been once heat-treated at a temperature of 200° C. or higher. Most preferred are those which have been sintered. In case of secondary aggregates of silica microbeads, it is preferred to use secondary aggregates obtained by allowing silica microbeads having a primary particle size of 10 to 50 nm to aggregate in a spherical shape and then sintering the spherical aggregates under appropriate conditions. In case of calcium carbonate fine particles or titanium fine particles, it is also preferred to use secondary aggregates obtained by sintering the aggregates of these materials under appropriate conditions.

These particles may be used after at least one additional ingredient has been adsorbed thereon, such as a coloring agent, photo-deterioration inhibiting agent, fluorescent agent, antistatic agent and any ingredient having good or poor affinity for the matrix resin. When necessary, additional particles other than the particles having a shape as described above may be added to the outer surface layer (B) for the purpose of improving opacifying and painting properties.

With respect to the surface of the outer surface layer (B), it is preferred that the relationship between the height Y (in μm) of peaks, based on the height of peaks giving the maximum number of peaks in the surface portion of the outer surface layer (B), and the number X (in mm$^{-2}$) of peaks in this portion, meets the following inequality:

$$-1.3 \log X + 5.2 \geq Y \geq -0.77 \log X + 2.31 \qquad (1)$$

wherein $X \geq 50$ and $Y \geq 0$.

This relationship makes it possible to give a composite film of the polyester type having excellent surface delustered appearance and excellent surface strength against peeling, while maintaining softness of the composite film. When the height Y of peaks is greater than $-1.3 \log X + 5.2$, surface strength against peeling becomes poor. When the height Y of peaks is less than $-0.77 \log X + 2.31$, excellent delustered appearance cannot be obtained or surface roughness will be appeared. In any case, when the height Y of peaks is out of the range given by the inequality (1), the thickness of the outer surface layer (B) must be increased in order to attain sufficient delustered appearance and sufficient surface strength against peeling, thereby causing a deterioration in the softness of the composite film.

The present invention also provides a void-containing composite film of the polyester type comprising (A) a polyester base layer containing fine voids and (B) at least one surface layer composed mainly of at least one thermoplastic resin and formed on at least one side of the polyester base layer (A), wherein the outer surface layer (B) contains 1% to 30% by weight of inorganic particles comprising primary particles having an average primary particle size $R_1$ of 0.1 to 2.0 μm and secondary particles having an average secondary particle size $R_2$ which is from 1.05 to 1.60 times the value of $R_1$; a particular particle size of the secondary particles giving 99% probability in the normal distribution for the presence of secondary particles smaller than the particular particle size (hereinafter referred to as 99% $R_2$) is not greater than 4.0 times the value of $R_1$; and the average value of the shortest distances between the centers of gravity for the inorganic particles (hereinafter referred to as $R_n$) is not greater than 5.0 times the value of $R_1$.

When the value of $R_1$ is less than 0.1 μm, sufficient opacifying effect and whiteness cannot be attained. When the value of $R_1$ is greater than 2.0 μm, the surface strength of the composite film is decreased by the formation of voids from inorganic particles. Moreover, when the other conditions fail to meet the above requirements, i.e., the secondary particles have an average secondary particle size $R_2$ out of the above range; the value of 99% $R_2$ is greater than 4.0 times the value of $R_1$; and the value of $R_n$ is greater than 5.0 times the value of $R_1$, unevenness will be observed in both opacifying effect and whiteness, because the dispersion state of inorganic particles is inferior. Preferably, the unevenness in opacifying power (light transmittance) is 10% or less of the average value thereof, and the unevenness in whiteness is less than 5.0 of the average value thereof. The composite film exhibiting such unevenness in both opacifying effect and whiteness has a higher commercial merit.

The term "average primary particle size", as used herein, refers to an average value of equivalent diameters of the circles defining for inorganic particles (i.e., an average value of diameters of the true circles each having the same area as the sectional area of the corresponding inorganic particle).

The term "average secondary particle size", as used herein, refers to an average value of equivalent diameters of the circles defining for inorganic particles when these inorganic particles are present in separate form (i.e., as a primary particle) or for aggregates of inorganic particles when at least two inorganic particles form an aggregate (i.e., as a secondary particle).

The term "primary particle", as used herein, refers to a particle composed of a single crystal or crystals, which is observed as a sphere or ellipsoid under an electron microscope.

The term "secondary particle", as used herein, refers to a pseudo-particle which is apparently observed as an aggregate of the respective spheres or ellipsoids under an electron microscope.

The term "the shortest distance between the centers of gravity", as used herein, refers to a distance between the centers of gravity for one particle and the nearest neighboring particle.

The void-containing composite film of the polyester type according to the present invention preferably has a surface roughness of 1.0 μm or less, more preferably 0.3 μm or less. When the surface roughness is greater than 1.0 μm, failure in printing will readily occur when the composite film is used for printing with a printer or the like.

The titanium dioxide particles used as an opacifying agent or white pigment for the void-containing composite film of the polyester type according to the present invention are preferably in crystalline form of the rutile type. More preferably, the particles of rutile-type titanium dioxide are those which have been surface-treated with aluminum oxide, silica, zinc, silicone-type resins, polysiloxsane-type resins, fluorocarbon-type resins, silane coupling agents or titanate coupling agents, polyol resins, polyvinylpyridine resins or the like. Most preferred are particles of rutile-type titanium dioxide which have been surface-treated with aluminum oxide.

The addition of titanium dioxide particles is to ensure sufficient opacifying effect and whiteness. In particular, the addition of rutile-type titanium dioxide particles is preferred because rutile-type titanium dioxide has excellent opacifying power and low activity, thus attaining a high stability to the polyester and suppressing the formation of by-products, as compared with anatase-type titanium dioxide.

The surface treatment of rutile-type titanium dioxide particles with aluminum oxide is to enlarge the surface area of the particles by this treatment; to suppress the formation of undesirable voids at the interface between the polyester base layer (A) and the outer surface layer (B) and also to improve the surface strength of the composite film against peeling by utilizing the fact that the boundary surface between the polyester portion and the aluminum oxide portion is hardly separated at the time of drawing because aluminum oxide has high adhesion to any polyester; and to suppress the formation of by-products which will accelerate a decrease in whiteness by covering the surface of active titanium dioxide with aluminum oxide so that the titanium dioxide particles can be present in more stable form to the polyester.

Thus, the present inventors have found that the use of rutile-type titanium dioxide particles, preferably those surface-treated with aluminum oxide, as an opacifying agent makes it possible to a void-containing white composite film of the polyester type, which is extremely excellent in opacifying power, surface strength against peeling and resistance to weather.

To the polymer mixture, any other ingredient may be added, such as a coloring agent, photo-deterioration inhibiting agent, fluorescent agent and antistatic agent, depending upon the application of the composite film.

The resulting polymer sheet is then subjected to orientation in at least one direction by, for example, any of the following procedures: (i) passing the sheet between two or more rolls each having a different rotation rate to draw the sheet (i.e., roll drawing technique); (ii) fixing the edges of the sheet with two or more clips, and then extending the sheet (i.e., tenter drawing technique); and (iii) drawing the sheet under air pressure (i.e, inflation drawing technique). At this time, fine particles of the thermoplastic resin which is not incompatible with the polyester, dispersed in the polyester film base material are deformed, and the separation occurs at the interface between the fine particles of the thermoplastic resin and the polyester base material, thereby forming voids around the fine particles.

Thus, the amount of the incompatible resin to be mixed with the polyester may vary depending upon the desired number of voids, but is preferably in the range of 3% to 40% by weight, particularly 8% to 35% by weight, based on the total weight of the polymer mixture. Amounts less than 3% by weight are difficult to increase the number of voids, thereby making it impossible to attain the desired softness, lightweight and painting properties. On the other hand, amounts greater than 40% by weight are not desired because thermal resistance and strength, particularly toughness, inherent to polyester films, are significantly damaged.

Additionally, a coating layer may be formed on the surface of the void-containing composite film of the polyester type according to the present invention, which improves wetting properties and adhesiveness to ink and coating agents. The coating layer is preferably composed mainly of polyester-type resin, although conventional resins for improving the adhesiveness of polyester films, can also be employed, such as polyurethane-type resins, polyesterurethane-type resins and acrylic-type resins.

For the formation of the coatings-layer, conventional procedures can be used, such as gravure coating method, kiss coating method, dip method, spray coating method, curtain coating method, air knife coating method, blade coating method and reverse roll coating method.

The coating layer is formed (i) on the surface of the polymer sheet before the orientation step; (ii) on the surface of the void-containing composite film which has been orientated in one direction before the orientation at a right angle in the other direction; or (iii) on the surface of the void-containing composite film after completion of the orientation.

In the present invention, the polyester base layer (A) and the outer surface layer (B) are to be laminated into a composite film. The process for the lamination is not particularly limited, and conventional procedures can be employed, such as a method in which two separate films which have been biaxially orientated, corresponding to the polyester base layer (A) and the outer surface layer (B), respectively, are attached to each other; and a method in which a non-drawn sheet component corresponding to the outer surface layer (B) is attached to the surface of a film which has been orientated in one direction, corresponding to the polyester base layer (A), followed by additional orientation at a right angle in the other direction. In view of the productivity, most preferred is lamination by a co-extrusion technique in which the respective materials for the polyester base layer (A) and the outer surface layer (B) are independently extruded from separate extruders and these extrudates are then led to a single die to form a non-drawn sheet, followed by orientation in at least one direction.

The conditions for orientation of a non-drawn sheet are important from the viewpoint of the production of a void-containing composite film of the polyester type having excellent toughness. For example, in case where a successive biaxial stretching process is employed, which is commonly used in the art, the following conditions are proposed. When a continuous sheet of the polymer mixture is drawn by a roll drawing technique in the direction of its length (i.e., machine direction (MD)), and then by a tenter drawing technique in the direction of its width (i.e., transverse direction (TD)), the temperature and the draw ratio in the roll drawing process (or MD drawing) are preferably the glass transition temperature of the polyester $+30°$ C. or lower and 2.0 to 5.0, respectively, for the formation of numerous voids, and the temperature and the draw ratio in the tenter drawing process (or TD drawing) are preferably 100° to 150° C. and 2.8 to 5, respectively, for the stable production of a composite film without breaking.

Further, it is desirable that the drawn void-containing film is heat-treated at a temperature of 200° C. or higher, preferably 220° C. or higher, and more preferably 230° C. or higher. At this time, the heat treatment should be accompanied with relaxation at a ratio of 3% to 8%. If the heat treatment is conducted at a temperature of lower than 200° C. or with relaxation at a ratio of less than 3%, it is impossible to obtain a void-containing composite film having a thermal shrinkage factor at 150° C. of less than 2%, preferably less than 1.7%, more preferably less than 1.5%.

With respect to the resulting void-containing composite film of the polyester type, the void percentage of a surface portion having 3 $\mu$m thickness from the surface of the polyester base layer (A) is 8% by volume or less, and the average void percentage of the composite film is 10% to 50% by volume, preferably 10% to 40% by volume, and more preferably 10% to 35% by volume.

If the void percentage of a surface portion having 3 $\mu$m thickness from the surface of the polyester base layer (A) is more than 8% by volume, it is impossible to obtain a void-containing composite film having satisfactory surface strength. Also, if the surface portion having 8% by volume or less void percentage is less than 3 $\mu$m in thickness from the surface of the polyester base layer (A), the resulting composite film does not have a sufficient surface strength to withstand peeling. Thus, there are some requirements in the present invention that the surface portion of the polyester base layer (A) containing a smaller number of voids as compared with the central portion thereof has a thickness of 3 μm or more; the void percentage of a surface portion having 3 μm thickness from the surface of the polyester base layer (A) is 8% by volume or less, and the average void percentage of the composite film is 10% to 50% by volume. If the average void percentage is less than 10% by volume, the resulting void-containing composite film of the polyester type does not have sufficient softness as well as painting and cushioning properties. On the other hand, it is difficult to prepare a void-containing composite film of the polyester type having an average void percentage of more than 50% by volume because the composite film often breaks during the drawing process. The resulting composite film, if obtained, is not preferred because of its insufficient surface strength and tensile strength.

The void-containing composite film of the polyester type according to the present invention has excellent toughness and preferably has an initial modulus of 300 kg/mm² or more. If the initial modulus is less than 300 kg/mm², the resulting composite film has low toughness.

The void-containing composite film of the polyester type according to the present invention is particularly superior in surface strength to conventional void-containing composite films of the polyester type, which are prepared by using polystyrene or polypropylene as a void generator, so that layer separation does not occur at the interface between the polyester base layer (A) and the outer surface layer (B). The void-containing composite film of the polyester type according to the present invention can be used as a base material for labels, stickers, posters, cards, recording paper, wrapping paper, printing paper for video image printers, bar code labels, printing paper for bar code printers, thermal recording paper, recording paper for sublimation transfer, recording paper for ink-jet transfer, offset printing paper, form printing paper, maps, dust-free paper, display boards, white-colored boards for writing or drawing, white-colored boards for writing or drawing equipped with electronic copying system, photographic printing paper, decorative paper, wall paper, constructional materials, bank notes, release paper, colored paper for holding play, calendars, magnetic cards, tracing paper, ordinary slips, delivery slips, pressure sensitive recording paper, copying paper, paper for clinical tests, reflector for parabola antennas, display reflectors and the like.

In the present invention, a polyester is used as a film base material because the resulting void-containing composite film of the polyester type has satisfactory thermal resistance and mechanical strength. Then, the polyester is mixed with a thermoplastic resin which is not compatible with the polyester to prepare a polymer mixture. By this procedure, the fine particles of the thermoplastic resin are dispersed in the polyester film base material. The dispersed fine particles cause the separation from the polyester film base material during an orientation or drawing process to form voids around the fine particles.

The non-drawn sheet of the polymer mixture is allowed to orientate in at least one direction to form a large number of fine voids in the resulting composite film. The fine voids thus formed can confer lightweight properties and good workability, as well as lowered cost per unit area, on the composite film. The resulting void-containing composite film has increased softness, thereby making possible distinct printing or transfer. Moreover, the void-containing composite film has satisfactory whiteness and high opacifying properties against light. Further, a large number of peaks derived from the thermoplastic resin are formed on the surface of the outer surface layer (B), thereby making it possible to write with a pencil or ball-point pen.

The void percentage of a surface portion having 3 μm thickness from the surface of the polyester base layer (A) is 8% by volume or less because surface strength is particularly increased. On the other hand, the average void percentage of the composite film is 10% to 50% by volume because appropriate painting and cushioning properties are obtained.

The substantial absence of voids which may be formed from void generators at the interface between the polyester base layer (A) and the outer surface layer (B) is to prevent the occurrence of surface peeling which may be caused by such voids.

The void-containing composite film of the polyester type thus obtained has excellent thermal resistance and mechanical strength, both of which are required for applications such as posters, labels, ordinary slips, delivery slips, bar code labels and various recording papers, e.g., pressure sensitive recording paper.

EXAMPLES

The present invention will be further illustrated by way of the following examples and comparative examples, which are not to be construed to limit the scope thereof.

The measurements and evaluations used in these examples and comparative examples are described below:

(1) Intrinsic Viscosity of Polyester

A polyester is dissolved into a mixed solvent of phenol (6 parts by weight) and tetrachloroethane (4 parts by weight). The intrinsic viscosity of this polyester solution is measured at 30° C.

(2) Melt Flow Index of Polystyrene-type Resin

The melt flow index of a polystyrene-type resin is measured at 200° C. under a 5 kg load according to the procedure of JIS K-7210.

(3) Apparent Specific Gravity of Film

The film is cut into 5.00 cm × 5.00 cm square sample. The thickness of the sample is measured at 50 different points to obtain the average thickness t (μm) of the sample. Then, the weight W (g) of the sample is measured to a precision of 0.1 mg. The apparent specific gravity of the film is calculated by the following formula:

$$\text{Apparent specific gravity} = W/(5 \times 5 \times t \times 10000)$$

(4) Average Void Percentage of Film

The average void percentage of the composite film is calculated by the following formula:

Average void percentage (% by volume) = $100 \times (1 - \text{true specific volume}/\text{apparent specific volume})$ wherein:

the specific volume = $x_1/d_1 + x_2/d_2 + x_3/d_3 + \ldots + x_i/d_i + \ldots$, and the apparent specific volume = 1/apparent specific gravity of the film, wherein $x_i$ is a weight fraction of component i and $d_i$ is a true specific gravity of component i.

The true specific gravity used for the calculation in the examples is 1.40 for polyethylene terephthalate, 1.05 for general-purpose polystyrene resin, 3.90 for anatase-type titanium dioxide, 4.20 for rutile-type titanium dioxide, 2.70 for calcium carbonate, and 2.20 for zeolite.

(5) Void Percentage of Surface Portion of Polyester Base Layer

The composite film is embedded into epoxy resin which is then hardened. The embedded film is cut with a microtome to form a cut surface which is parallel to the lengthwise direction of the film and perpendicular to the film surface. At this time, the direction of cutting with the microtome is parallel to the lengthwise direction of the film. After metallizing, this cut surface is observed by an electron microscope with 2000x magnification. A photograph of the sectional view of the film near the surface thereof is taken by a scanning electron microscope (model S-510, HITACHI). Then, all the images of the voids present in the surface portion having 3 μm thickness from the surface of the polyester base layer (A) are traced into a tracing film, and painted out. The resulting figure is analyzed by an image analyzer (Luzex II D, Nireco) to calculate a void percentage (% by volume).

(6) Void Percentage of Central Portion of Polyester Base Layer

The void percentage of the central portion having about 20 μm thickness in the center of the polyester base layer is measured by the same procedure as described in (5).

(7) Definition of Interface between Polyester Base Layer (A) and Outer surface layer (B), as well as Thickness of Outer surface layer (B)

Sampling is conducted in the same manner as described in (5). The cut surface is observed from the surface of the outer surface layer (B) toward the polyester base layer (A), and the position at which a dispersed particle of the incompatible resin is first found is defined as the interface between the polyester base layer (A) and the outer surface layer (B). The thickness of the outer surface layer (B) is defined as the distance from its surface to this interface.

(8) Size of Voids at Interface between Polyester Base Layer (A) and Outer Surface Layer (B), as well as Presence of Voids On the boundary of the incompatible resin particles at the interface as defined in (7) and the polyester film base material, the longer diameter of voids observed on the opposite side of the uncompatible resin particles to the direction of movement for the blade of a microtome is measured in the unit of 1 μm. Measurement of the longer diameter of voids to a precision of less than 1 μm has no meaning in view of the deformation of the film at the time of cutting. Even if there are numerous voids which cannot be detected in this method, these voids are too fine to have an influence on the surface strength of the composite film against peeling. Therefore, when no voids are observed in this method, it is defined as the case where there exist substantially no voids.

(9) Initial Modulus

The initial modulus is measured according to the procedure of ASTM D-882-81 (Method A).

(10) Thermal Shrinkage Factor

The film is cut into a sample of 10 mm in width and 250 mm in length. A pair of marks are put on the sample at a distance of 200 mm. The sample is then fixed under a constant tension of 5 g, and the distance A between the marks is measured. After that, the sample is put into an oven under no tension in an atmosphere at 150° C. for 30 minutes, and the distance B between the marks is measured. The thermal shrinkage factor is calculated by the following formula:

Thermal shrinkage factor (%) = (A−B)/A × 100

(11) Light Transmittance

The light transmittance of the film is measured by Poic integration sphere type H.T.R. meter (Nohon Seimitsu Kogaku) according to the procedure of JIS-K6714. Smaller values of the light transmittance indicate higher opacifying powers.

(12) Surface Strength of the Film against Peeling

The surface strength of the film is evaluated by a peeling test with two kinds of adhesive cellophane tapes (18 mm and 9 mm in width, respectively; Nichiban). With an adhesive cellophane tape of a smaller width, larger force will be exerted on unit area, so that peeling will readily occur. The adhesive cellophane tape is allowed to stick to the film, and then peeled off in the direction at an angle of about 150°, while the film is being kept flat. According to the area of the peeled surface portion of the void-containing composite film, the surface strength of the film is classified as follows:

Class 5—All the parts of the surface portion are peeled off;

Class 4—Most parts of the surface portion are peeled off;

Class 3—About a half of the surface portion is peeled off;

Class 2—Most parts of the surface portion are not peeled off; and

Class 1—None of the surface portion is peeled off.

(13) Stack-writing Property

Ten films are put in layers, and a certain letter is written on the uppermost film with force using a ball-point pen. If any mark of the letter is found on the lowermost film, the stack-writing property of the film is evaluated as "good". If no mark is found, the stack-writing property is evaluated as "poor".

(14) Whiteness

The whiteness is measured by color difference meter (model N1001, Nihon Denshoku Kogyo) according to the method B (two-wavelength method) of JIS-L1015-1981.

(15) Surface Roughness

The average roughness is measured by surface roughness meter (Surfcorn model 300A, Tokyo Seimitsu) with a stylus tip radius of 2 μm, a contact load of 30 mg, a measurement load of 30 mg, and a cut-off of 0.8 mm, according to the procedure of JIS-B0601-1982. The surface roughness of the film is evaluated by this average roughness.

(16) Average Particle Size of Inorganic Particles

For the particles having a spherical or cubic shape, or an intermediate shape therebetween, the average particle size thereof is calculated from the particle sizes of arbitrary 100 particles which are obtained by observing the section of the film using a scanning electron microscope (model S-510, HITACHI) with 10000x magnification.

For the particles having any other shape, powder is well dispersed in the EG slurry with high-speed stirring and the particle size distribution in the slurry is measured with 50% integration by an apparatus of the permeation type for measuring particle size distribution by centrifugal sedimentation (model SA-CP3, Shimazu).

(17) Surface glossiness

By measurement of 60° gloss (hereinafter referred to as G1 60) using glossmeter (model VGS-1001DP, Nihon Denshoku), the glossiness is evaluated as follows:

G1 60, 100−70 . . . Poor
69−45 . . Fair
44−20 . . . Good
19−10 . . . Excellent

The light transmittance, surface glossiness and whiteness are represented using the average of measured values at arbitrary 30 points, together with the scattering of these values which is the maximum or minimum value having a greater difference in the absolute value from the average.

(18) Yellowing factor

The film is treated by a Q-UV ultraviolet light exposure apparatus (The Q-Panel Company) for 100 hours, and the yellowing factor is evaluated by a difference (Δb) between the color values b of the white film before and after the exposure to ultraviolet light. The period for exposure and moisture condensation cycle in the Q-Uv apparatus are both 4 hours. The color value b is measured by a color difference meter (Model Z-1001, Nihon Denshoku Kogyo) according to the B method of JIS-L1015-1981 (two-wavelength method). If the film has a smaller color value b, the film has a strong blue tint and excellent whiteness. If the film has a larger color value b, the film has a strong yellow tint and poor whiteness. Therefore, a larger difference (Δb) between the color values b of the film before and after the exposure to ultraviolet light indicates a larger decrease in the whiteness of the film.

EXAMPLE 1

As the raw material for the polyester base layer (A), a polymer mixture of 75% by weight of polyethylene terephthalate having an intrinsic viscosity of 0.62 and 25% by weight of general-purpose polystyrene having a melt flow index of 2.0 g/10 min., was used. As the raw material for the outer surface layer (B), a polymer mixture of 95% by weight of polyethylene terephthalate having an intrinsic viscosity of 0.62 and 5% by weight of futile-type titanium dioxide having an average particle size of 0.3 μm was used. These mixtures were independently melted in different twin-screw extruders at the maximum temperature of 295° C. and melt-extruded at 290° C. at an average flow rate of 8.8 m/sec., from a T-die having a 1.0 mm slit. The extrudate was adhered to the surface of a cooling roll by electrostatic force, and solidified to obtain a non-drawn sheet consisting of the polyester base layer (A) having a thickness of 440 μm interposed between a pair of the outer surface layers (B) each having a thickness of 30 μm.

Then, the non-drawn sheet was drawn at 83° C. by a roll stretching machine at a draw ratio of 4.0 in the direction of its length (i.e., MD direction), and then at 130° C. by a tenter at a draw ratio of 3.5 in the direction of its width (i.e., TD direction), and heat-treated at 235° C. while relaxing the sheet at a ratio of 4%, resulting in a void-containing composite film of the polyester type consisting of the polyester base layer (A) having a thickness of 44 μm interposed between a pair of outer surface layers (B) each having a thickness of 3 μm.

The physical properties of the resulting void-containing composite film are shown in Tables 1 and 2. In particular, the void percentage of the surface portion of the polyester base layer (A) of the composite film was 7% by volume, and the average void percentage of the composite film was 37% by volume. The thickness of the surface portion containing a smaller number of voids was about 3 μm. Also, the void-containing composite film of the polyester type obtained in this example had excellent surface strength and good stack-writing properties.

When the non-drawn sheet of this example was observed by a scanning electron microscope, the average particle size of the fine particles of polystyrene was 6.5 μm in the central portion and 1.2 μm in the surface portion of the polyester base layer (A).

EXAMPLE 2

As the raw material for the polyester base layer (A), a polymer mixture of 80% by weight of polyethylene terephthalate having an intrinsic viscosity of 0.62, 15% by weight of general-purpose polystyrene having a melt flow index of 2.0 g/10 min., and 5% by weight of anatase-type titanium dioxide was used. As the raw material for the outer surface layer (B), a polymer mixture of 95% by weight of polyethylene terephthalate having an intrinsic viscosity of 0.62 and 5% by weight of rutile-type titanium dioxide having an average particle size of 0.3 μm was used. These mixtures were independently melted in different twin-screw extruders at the maximum temperature of 295° C., and melt-extruded at 290° C. at an average flow rate of 8.8 m/sec., from a T-die having a 1.0 mm slit. The extrudate was adhered to the surface of a cooling roll by electrostatic force, and solidified to obtain a non-drawn sheet consisting of the polyester base layer (A) having a thickness of 440 μm interposed between a pair of the outer surface layers (B) each having a thickness of 30 μm.

Then, the non-drawn sheet was drawn at 83° C. by a roll stretching machine at a draw ratio of 3.5 in the direction of its length (i.e., MD direction), and then at 130° C. by a tenter at a draw ratio of 3.5 in the direction of its width (i.e., TD direction), and heat-treated at 235° C. while relaxing the sheet at a ratio of 4%, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 1 and 2. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.0 μm in the central portion and 0.7 μm in the surface portion of the polyester base layer (A).

EXAMPLE 3

A non-drawn sheet having a thickness of 500 μm was obtained by the same procedure as described in Example 2, except that the polymer mixture as the raw material for the polyester base layer (B) was melted in a twin-screw extruder at the maximum temperature of 292° C.

Then, the non-drawnsheet was drawn and heat-treated by the same procedure as described in Example 2, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 1 and 2. In particular, the void percentage of the surface portion of the polyester base layer (A) of the composite film was 1% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.0 μm in the central portion and 0.7 μm in the surface portion of the polyester base layer (A).

EXAMPLE 4

A non-drawn sheet having a thickness of 500 μm was obtained by the same procedure as described in Example 2, except that the polymer mixtures as the raw materials for the polyester base layer (A) and the outer surface layer (B) were independently melted in different twin-screw extruders at the maximum temperature of 290° C.

Then, the non-drawnsheet was drawn and heat-treated by the same procedure as described in Example 2, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 1 and 2. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-dram sheet of this example was observed by a scanning electron microscope, the average particle size of the fine particles of polystyrene was 5.0 μm in the central portion and 0.7 μm in the surface portion of the polyester base layer (A).

EXAMPLE 5

As the raw material for the polyester base layer (A), a polymer mixture of 75% by weight of polyethylene terephthalate having an intrinsic viscosity of 0.62 and 25% by weight of general-purpose polystyrene having a melt flow index of 2.0 g/10 min., was used. As the raw material for the outer surface layer (B), a polymer mixture of 95% by weight of polyethylene terephthalate having an intrinsic viscosity of 0.62 and 5% by weight of rutile-type titanium dioxide having an average particle size of 0.3 μm was used. These mixtures were independently melted in different twin-screw extruders, and melt-extruded from a T-die having a 1.0 mm slit at an average flow rate of 8.8 m/sec. The extrudate was adhered to the surface of a cooling roll by electrostatic force, and solidified to obtain a non-drawn sheet consisting of the polyester base layer (A) having a thickness of 440 μm interposed between a pair of the outer surface layers (B) each having a thickness of 30 μm.

For the melt extrusion of a sheet component corresponding to the polyester base layer (A), the temperature of the twin-screw extruder was 250° C. at the portion nearest the raw material feed zone, and gradually increased to the maximum temperature of 295° C. at the melt zone. At the melt zone, the polymer mixture was Kneaded for about 10 minutes, and the temperature at the screw tip was 290° C. Thereafter, the temperature of the melt line was gradually decreased, and the final temperature at the T-die was 280° C.

For the melt extrusion of sheet components corresponding to a pair of the outer surface layers (B), the temperature of the twin-screw extruder was 250° C. at the portion nearest the raw material feed zone, and gradually increased to the maximum temperature of 285° C. At the melt zone, the polymer mixture was kneaded for about 1 minute, and the temperature at the screw tip was 280° C. Thereafter, while keeping the temperature, the raw material was fed to the melt line, and the sheet component corresponding to the outer surface layer (B) was adhered to each side of the sheet component corresponding to the polyester base layer (A). The laminated sheet components were fed to the T-die as such.

Then, the non-drawn sheet was drawn at 83° C. by a roll stretching machine at a draw ratio of 4.0 in the direction of its length (i.e, MD direction), and then at 130° C. by a tenter at a draw ratio of 3.5 in the direction of its width (i.e., TD direction), and heat-treated at 235° C. while relaxing the sheet at a ratio of 4%, resulting in a void-containing composite film of the polyester type consisting of the polyester base layer (A) having a thickness of 44 μm composed between a pair of the outer surface layers (B) each having a thickness of 3 μm.

The physical properties of the resulting void-containing composite film are shown in Tables 1 and 2. In particular, the void percentage of the surface portion of the polyester base layer (A) of the composite film was 7% by volume, and the average void percentage of the composite film was 37% by volume. The thickness of the surface portion containing a smaller number of voids was about 3 μm.

When the non-dram sheet of this example was observed by a scanning electron microscope, the average particle size of the fine particles of polystyrene was 6.5 μm in the central portion and 1.0 μm in the surface portion of the polyester base layer (A).

In the void-containing composite films of the polyester type, which were obtained in Examples 1 to 5, the ratio of length to thickness of the polystyrene particles present at the interface between the polyester base layer (A) and the outer surface layer (B) was not less than 10. Even when observed by an electron microscope with 2000x magnification, there were no voids formed from the polystyrene particles present at the interface. Therefore, these void-containing composite films had excellent surface strength, no tendency to cause layer separation, and good stack-writing properties.

EXAMPLE 6

A non-drawn sheet having a thickness of 500 μm was obtained by the same procedure as described in Example 5, except that a polymer mixture of 80% by weight of polyethylene terephthalate having an intrinsic viscosity of 0.62, 15% by weight of general-purpose polystyrene having a melt flow index of 2.0 g/10 min., and 5% by weight of anatase-type titanium dioxide was used as the raw material for the polyester base layer (A).

Then, the non-drawn sheet was drawn at 83° C. by a roll stretching machine at a draw ratio of 3.5 in the direction of its length (i.e., MD direction), and then at 130° C. by a tenter at a draw ratio of 3.5 in the direction of its width (i.e., TD direction), and heat-treated at 235° C. while relaxing the sheet at a ratio of 4%, resulting in a void-containing composite film of the polyester type consisting of the polyester base layer (A) having a thickness of 44 μm interposed between a pair of the outer surface layers. (B) each having a thickness of 3 μm.

The physical properties of the resulting void-containing composite film are shown in Tables 1 and 2. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.0 μm in the central portion and 0.7 μm in the surface portion of the polyester base layer (A).

EXAMPLE 7

As the raw material for the polyester base layer (A), a polymer mixture of 80% by weight of polyethylene terephthalate having an intrinsic viscosity of 0.62, 15% by weight of general-purpose polystyrene having a melt flow index of 2.0 g/10 min., and 5% by weight of anatase-type titanium dioxide was used. As the raw material for the outer surface layer (B), a polymer mixture of 95% by weight of polyethylene terephthalate having an intrinsic viscosity of 0.62 and 5% by weight of rutile-type titanium dioxide having an average particle size of 0.3 μm was used.

For the melt extrusion of sheet components corresponding to the outer surface layers (B), twin-screw extruders were connected in series. The raw material was kneaded from the raw material feed zone of one twin-screw extruder to the outlet of the other twin-screw extruder for about 15 minutes. The kneaded raw material was filtered through a membrane having 10 μm pores, melted at the maximum temperature of 290° C., and melt-extruded from a T-die, so that the sheet component corresponding to the polyester base layer (A) was interposed between a pair of the sheet components corresponding to the outer surface layers (B). The extrudate was adhered to the surface of a cooling roll by electrostatic force, and solidified to obtain a non-drawn sheet having a thickness of about 500 μm.

Then, the non-drawn sheet was drawn at 90° C. by a roll stretching machine at a draw ratio of 3.4 in the direction of its length (i.e., MD direction), and then at 135° C. by a tenter at a draw ratio of 3.4 in the direction of its width (i.e., TD direction), and heat-treated at 235° C. while relaxing the sheet at a ratio of 3%, resulting in a void-containing composite film of the polyester type consisting of the polyester base layer (A) having a thickness of 42 μm interposed between a pair of outer surface layers (B) each having a thickness of 4 μm.

The physical properties of the resulting void-containing composite film are shown in Tables 3 and 4. The void-containing composite film of the polyester type obtained in this example had no unevenness of opacifying effect and whiteness.

EXAMPLE 8

A non-drawn sheet having a thickness of about 500 μm was obtained by the same procedure as described in Example 7, except that the polymer mixtures as the raw materials for the polyester base layer (A) and the outer surface layer (B) were independently melted in a twin-screw extruder at the maximum temperature of 310° C. and in serially-connected two twin-screw extruders at the maximum temperature of 285° C., respectively.

Then, the non-drawnsheet was drawn and heat-treated by the same procedure as described in Example 7, resulting in a void-containing composite film of the polyester type consisting of the polyester base layer (A) having a thickness of 42 μm interposed between a pair of the outer surface layers (B) each having a thickness of 4 μm.

The physical properties of the resulting void-containing composite film are shown in Tables 3 and 4. The void-containing composite film of the polyester type obtained in this example had no unevenness of opacifying effect and whiteness.

EXAMPLE 9

A non-drawn sheet having a thickness of about 500 μm was obtained by the same procedure as described in Example 7, except that the polymer mixtures as the raw materials for the polyester base layer (A) and the outer surface layer (B) were independently melted in a twin-screw extruder at the maximum temperature of 295° C. and in serially-connected two twin-screw extruders at the maximum temperature of 285° C., respectively.

Then, the non-drawnsheet was drawn and heat-treated by the same procedure as described in Example 7, resulting in a void-containing composite film of the polyester type consisting of the polyester base layer (A) having a thickness of 42 μm interposed between a pair of the outer surface layers (B) each having a thickness of 4 μm.

The physical properties of the resulting void-containing composite film are shown in Tables 3 and 4. The void-containing composite film of the polyester type obtained in this example had no unevenness of opacifying effect and whiteness.

EXAMPLE 10

As the raw material for the polyester base layer (A), a polymer mixture of 75% by weight of polyethylene terephthalate having an intrinsic viscosity of 0.62 and 25% by weight of general-purpose polystyrene having a melt flow index of 2.0 g/10 min., was used. As the raw material for the outer surface layer (B), a polymer mixture of 95% by weight of polyethylene terephthalate having an intrinsic viscosity of 0.62 and 5% by weight of rutile-type titanium dioxide having an average particle size of 0.3 μm was used. These mixtures were independently melted in different twin-screw extruders, and melt-extruded from a T-die having a 1.0 mm slit at an average flow rate of 8.8 m/sec. The extrudate was adhered to the surface of a cooling roll by electrostatic force, and solidified to obtain a non-drawn sheet consisting of the polyester base layer (A) having a thickness of 440 μm interposed between a pair of the outer surface layers (B) each having a thickness of 30 μm.

For the melt extrusion of a sheet component corresponding to the polyester base layer (A), the temperature of the twin-screw extruder was 250° C. at the portion nearest the raw material feed zone, and gradually increased to the maximum temperature of 295° C. at the melt-zone. At the melt zone, the polymer mixture was kneaded for about 10 minutes, and the temperature at the screw tip was 290° C. Thereafter, the temperature of the melt line was gradually decreased, and the final temperature at the T-die was 280° C.

For the melt extrusion of sheet components corresponding to a pair of the outer surface layers (B), two twin extruders were connected in series, and the temperature of the twin-screw extruders was 250° C. at the portion nearest the raw material feed zone of one twin-screw extruder, and gradually increased to the maximum temperature of 295° C. The raw material was kneaded from the raw material feed zone of one twin-screw extruder to the outlet of the other twin-screw extruder for about 15 minutes, and filtered through a membrane having 10 μm pores. The temperature at the screw tip of the other twin-screw extruder was 280° C. Thereafter, while keeping the temperature, the raw material was fed to the melt line, and just before the introduction to the T-die, the sheet component corresponding to the outer surface layer (B) was adhered to each side of the sheet component corresponding to the polyester base layer (A). The laminated sheet components were fed to the T-die as such.

Then, the non-drawn sheet was drawn at 83° C. by a roll stretching machine at a draw ratio of 4.0 in the direction of its length (i.e., MD direction), and then at 140° C. by a tenter at a draw ratio of 3.5 in the direction of its width (i.e., TD direction), and heat-treated at 235° C. while relaxing the sheet at a ratio of 3%, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 5 and 6. In particular, the void percentage of the surface portion of the polyester base layer (A) of the composite film was 7% by volume, and the average void percentage of the composite film was 37% by volume. The thickness of the surface portion containing a smaller number of voids was about 3 μm.

In the void-containing composite films of the polyester type obtained in this example, the ratio of length to thickness of the polystyrene particles present at the interface between the polyester base layer (A) and the outer surface layer (B) was not less than 10. Even when observed by an electron microscope with 2000x magnification, there were no voids formed from the polystyrene particles present at the interface. Therefore, these void-containing composite films had excellent surface strength, no tendency to cause layer separation, and good stack-writing properties.

When the non-drawn sheet of this example was observed by a scanning electron microscope, the average particle size of the fine particles of polystyrene was 6.5 μm in the central portion and 1.2 μm in the surface portion of the polyester base layer (A).

EXAMPLE 11

A non-drawn sheet having a thickness of about 500 μm was obtained by the same procedure as described in Example 10, except that a polymer mixture of 80% by weight of polyethylene terephthalate having an intrinsic viscosity of 0.62, 15% by weight of general-purpose polystyrene having a melt flow index of 2.0 g/10 min., and 5% by weight of anatase-type titanium dioxide was used as the raw material for the polyester base layer (A).

Then, the non-drawn sheet was drawn at 83° C. by a roll stretching machine at a draw ratio of 3.5 in the direction of its length (i.e., MD direction), and then at 140° C. by a tenter at a draw ratio of 3.5 in the direction of its width (i.e., TD direction), and heat-treated at 235° C. while relaxing the sheet at a ratio of 4%, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 5 and 6. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.0 μm in the central portion and 0.7 μm in the surface portion of the polyester base layer (A).

EXAMPLE 12

A non-drawn sheet having a thickness of about 500 μm was obtained by the same procedure as described in Example 11, except that a polymer mixture as the raw material for the outer surface layer (B) was melted at the maximum temperature of 285° C.

Then, the non-dram sheet was drawn and heat-treated by the same procedure as described in Example 11, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 5 and 6. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.0 μm in the central portion and 0.7 μm in the surface portion of the polyester base layer (A).

EXAMPLE 13

A non-drawn sheet having a thickness of about 500 μm was obtained by the same procedure as described in Example 12, except that a polymer mixture of 90% by weight of polyethylene terephthalate having an intrinsic viscosity of 0.62 and 10% by weight of rutile-type titanium dioxide having an average particle size of 0.3 μm was used as the raw material for the outer surface layer (B).

Then, the non-drawnsheet was drawn and heat-treated by the same procedure as described in Example 12, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 5 and 6. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.0 μm in the central portion and 0.7 μm in the surface portion of the polyester base layer (A).

COMPARATIVE EXAMPLE 1

A non-drawn sheet having a thickness of about 500 μm was obtained by the same procedure as described in Example 12, except that no sheet component corresponding to the outer surface layer (B) was contained in the sheet.

Then, the non-drawnsheet was drawn and heat-treated by the same procedure as described in Example 12, resulting in a void-containing composite film of the polyester type consisting only of the polyester base layer (A) having a thickness of 50 μm.

The physical properties of the resulting void-containing composite film are shown in Tables 5 and 6. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.0 μm in the central portion and 0.7 μm in the surface portion of the polyester base layer (A).

COMPARATIVE EXAMPLE 2

A non-drawn sheet having a thickness of about 500 μm was obtained by the same procedure as described in Example 12, except that polymer mixtures as the raw materials for the polyester base layer (A) and the outer surface layer (B) were independently melted in different twin-screw extruders, and melt-extruded from a T-die having a 1.0 mm slit at an average flow rate of 4.4 m/sec. The latter was kneaded from the raw material feed zone of one twin-screw extruder to the outlet of the other twin-screw extruder for about 2 minutes.

Then, the non-drawnsheet was drawn and heat-treated by the same procedure as described in Example 11, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 5 and 6. In particular, the void percentage of the surface portion of the polyester base layer (A) of the composite film was 17% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.9 μm in the central portion and 5.3 μm in the surface portion of the polyester base layer (A).

COMPARATIVE EXAMPLE 3

A non-drawn sheet having a thickness of about 500 μm was obtained by the same procedure as described in Example 12, except that a polymer mixture of 95% by weight of polyethylene terephthalate having an intrinsic viscosity of 0.62 and 5% by weight of anatase-type titanium dioxide was used as the raw material for the polyester base layer (A).

Then, the non-drawnsheet was drawn and heat-treated by the same procedure as described in Example 12, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 5 and 6. In this examples, no void generator (i.e., thermoplastic resin which is not compatible with the polyester) was used. Therefore, the resulting void-containing composite film contained no fine voids in the polyester base layer (A) and had an increased apparent specific gravity, which is unfavorable for lightweight properties.

EXAMPLE 14

A non-drawn sheet having a thickness of about 500 μm was obtained by the same procedure as described in Example 12, except that a polymer mixture of 95% by weight of polyethylene terephthalate having an intrinsic viscosity of 0.62 and 5% by weight of calcium carbonate having an average particle size of 0.6 μm was used as the raw material for the outer surface layer (B).

Then, the non-drawnsheet was drawn and heat-treated by the same procedure as described in Example 12, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 5 and 6. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.7 μm in the central portion and 0.7 μm in the surface portion of the polyester base layer (A).

EXAMPLE 15

A non-drawn sheet having a thickness of about 500 μm was obtained by the same procedure as described in Example 12, except that a polymer mixture of 95% by weight of polyethylene terephthalate having an intrinsic viscosity of 0.62 and 5% by weight of calcium carbonate having an average particle size of 1 μm was used as the raw material for the outer surface layer (B).

Then, the non-drawnsheet was drawn and heat-treated by the same procedure as described in Example 12, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 5 and 6. In particular, the void percentage of the surface portion of the polyester base layer (A) of the composite film was 2% by volume, and the average void percentage of the composite film was 21% by volume. The thickness of the surface portion containing a smaller number of voids was about 3 μm.

When the non-drawn sheet of this example was observed by a scanning electron microscope, the average particle size of the fine particles of polystyrene was 5.7 μm in the central portion and 0.7 μm in the surface portion of the polyester base layer (A).

EXAMPLE 16

A non-drawn sheet having a thickness of about 500 μm was obtained by the same procedure as described in Example 12, except that a polymer mixture of 98% by weight of polyethylene terephthalate having an intrinsic viscosity of 0.62 and 2% by weight of spherical zeolite with notched irregularities on the surface thereof having an average particle size of 1.5 μm was used as the raw material for the outer surface layer (B) having a two-layer structure.

Then, the non-drawnsheet was drawn and heat-treated by the same procedure as described in Example 12, resulting in a void-containing composite film of the polyester type consisting of the polyester base layer (A) having a thickness of 32 μm interposed between a pair of the outer surface layers (B) each having a thickness of 3 μm.

The physical properties of the resulting void-containing composite film are shown in Tables 7 and 8. In particular, the void percentage of the surface portion of the polyester base layer (A) of the composite film was 2% by volume, and the average void percentage of the composite film was 22% by volume.

Figure 2:
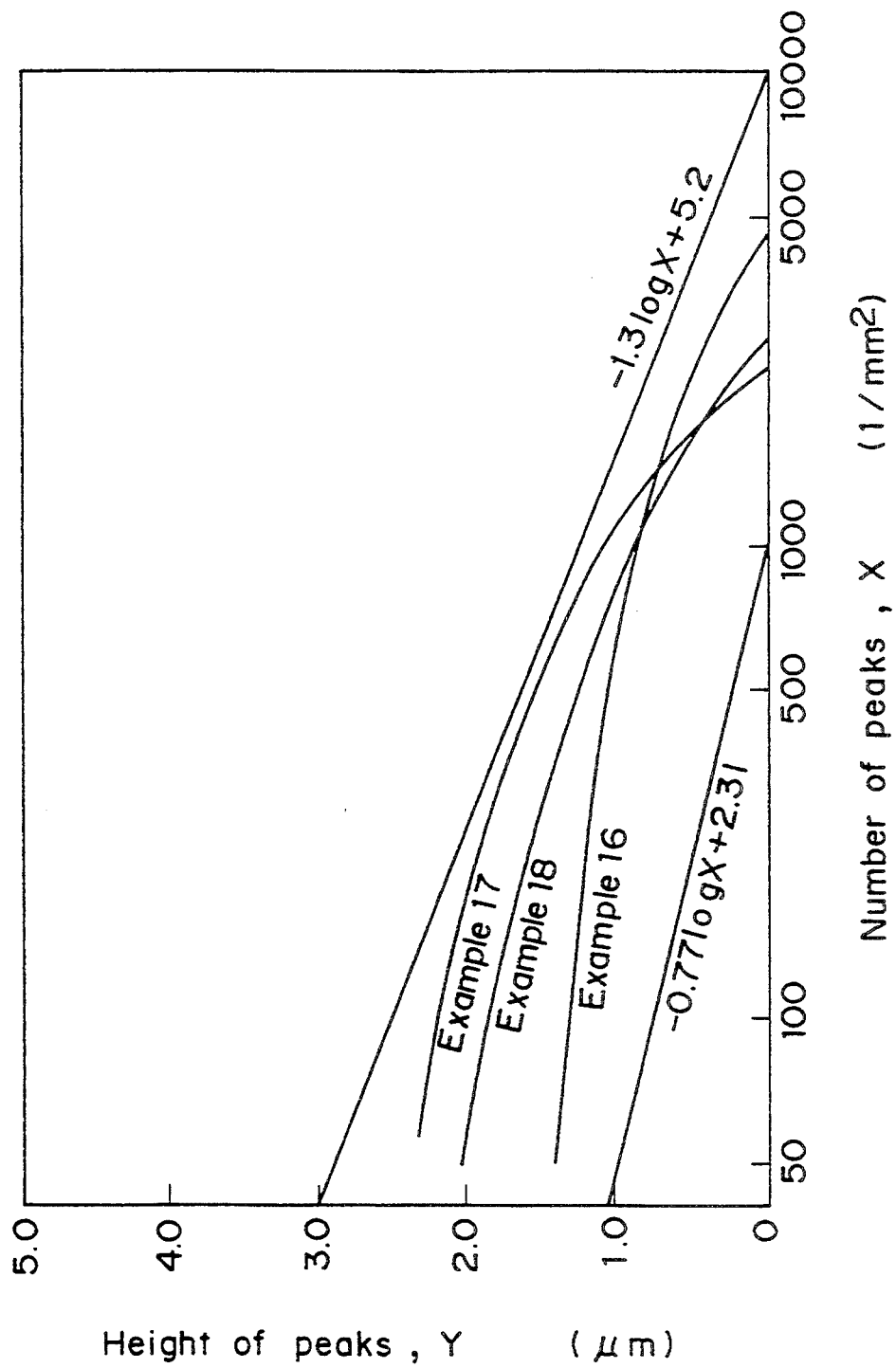
FIG. 2 is a graph showing the relationship between the height of peaks and the number of peaks in the surface portion of the outer surface layer (B) with respect to the void-containing composite films of the polyester type, which were obtained in Examples 16 to 18 of this invention. Also shown in this figure are the curves corresponding to the equations: $Y = -1.3 \log X + 5.2$ and $Y = -0.77 \log X + 2.31$.

Also, the relationship between the height of peaks and the number of peaks in the surface portion of the outer surface layer (B) of the composite film is shown in FIG. 2. As seen from this figure, the void-containing composite film of this example met the inequality (1).

EXAMPLE 17

A non-drawn sheet having a thickness of about 500 μm was obtained by the same procedure as described in Example 12, except that a polymer mixture of 93% by weight of polyethylene terephthalate having an intrinsic viscosity of 0.62 and 7% by weight of spherical zeolite with notched irregularities on the surface thereof having an average particle size of 3.3 μm was used as the raw material for the outer surface layer (B).

Then, the non-drawnsheet was drawn and heat-treated by the same procedure as described in Example 12, resulting in a void-containing composite film of the polyester type consisting of the polyester base layer (A) having a thickness of 42 μm interposed between a pair of the outer surface layers (B) each having a thickness of 4 μm.

The physical properties of the resulting void-containing composite film are shown in Tables 7 and 8. In particular, the void percentage of the surface portion of the polyester base layer (A) of the composite film was 2% by volume, and the average void percentage of the composite film was 21% by volume.

Also, the relationship between the height of peaks and the number of peaks in the surface portion of the outer surface layer (B) of the composite film is shown in FIG. 2. As seen from this figure, the void-containing composite film of this example met the inequality (1).

EXAMPLE 18

A non-drawn sheet having a thickness of about 500 μm was obtained by the same procedure as described in Example 12, except that a polymer mixture of 93% by weight of polyethylene terephthalate having an intrinsic viscosity of 0.62, 4% by weight of cubic zeolite with notched irregularities on the surface thereof having an average particle size of 1.5 μm, and 3% by weight of rutile-type titanium dioxide having an average particle size of 0.3 μm was used as the raw material for the outer surface layer (B) having a two-layer structure.

Then, the non-drawnsheet was drawn and heat-treated by the same procedure as described in Example 12, resulting in a void-containing composite film of the polyester type consisting of the polyester base layer (A) having a thickness of 40 μm interposed between a pair of the outer surface layers (B) each having a thickness of 5 μm.

The physical properties of the resulting void-containing composite film are shown in Tables 7 and 8. In particular, the void percentage of the surface portion of the polyester base layer (A) of the composite film was 2% by volume, and the average void percentage of the composite film was 23% by volume.

Also, the relationship between the height of peaks and the number of peaks in the surface portion of the outer surface layer (B) of the composite film is shown in FIG. 2. As seen from this figure, the void-containing composite film of this example met the inequality (1).

EXAMPLE 19

A non-drawn sheet having a thickness of about 500 μm was obtained by the same procedure as described in Example 12, except that a polymer mixture of 95% by weight of polyethylene terephthalate having an intrinsic viscosity of 0.62 and 5% by weight of anatase-type titanium oxide having an average particle size of 0.3 μm was used as the raw material for the outer surface layer (B).

Then, the non-drawnsheet was drawn and heat-treated by the same procedure as described in Example 12, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 9 and 10. In particular, the void percentage of the surface portion of the polyester base layer (A) of the composite film was 2% by volume, and the average void percentage of the composite film was 21% by volume.

EXAMPLE 20

A non-drawn sheet having a thickness of about 500 μm was obtained by the same procedure as described in Example 12, except that a polymer mixture of 95% by weight of polyethylene terephthalate having an intrinsic viscosity of 0.62 and 5% by weight of rutile-type titanium oxide having an average particle size of 0.3 μm was used as the raw material for the outer surface layer (B).

Then, the non-drawnsheet was drawn and heat-treated by the same procedure as described in Example 12, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 9 and 10. In particular, the void percentage of the surface portion of the polyester base layer (A) of the composite film was 2% by volume, and the average void percentage of the composite film was 21% by volume.

EXAMPLE 21

A non-drawn sheet having a thickness of about 500 μm was obtained by the same procedure as described in Example 12, except that a polymer mixture of 95% by weight of polyethylene terephthalate having an intrinsic viscosity of 0.62 and 5% by weight of SiO$_2$-treated rutile-type titanium oxide having an average particle size of 0.3 μm was used as the raw material for the outer surface layer (B), and this raw material after kneading was filtered through a membrane having 100 μm pores.

Then, the non-drawnsheet was drawn and heat-treated by the same procedure as described in Example 12, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 9 and 10. In particular, the void percentage of the surface portion of the polyester base layer (A) of the composite film was 2% by volume, and the average void percentage of the composite film was 21% by volume.

EXAMPLE 22

A non-drawn sheet having a thickness of about 500 μm was obtained by the same procedure as described in Example 12, except that a polymer mixture of 95% by weight of polyethylene terephthalate having an intrinsic viscosity of 0.62 and 5% by weight of Al$_2$O$_3$-treated rutile-type titanium oxide having an average particle size of 0.3 μm was used as the raw material for the outer surface layer (B).

Then, the non-drawnsheet was drawn and heat-treated by the same procedure as described in Example 12, resulting in a void-containing composite film of the polyester type consisting of the polyester base layer (A) having a thickness of 44 μm interposed between a pair of the outer surface layers (B) each having a thickness of 3 μm.

The physical properties of the resulting void-containing composite film are shown in Tables 9 and 10. In particular, the void percentage of the surface portion of the polyester base layer (A) of the composite film was 2% by volume, and the average void percentage of the composite film was 21% by volume.

TABLE 1

| Ex. No | Polyester base layer (A) Ingredients | Amounts (wt %) | Outer surface layer (B) Ingredients | Amounts (wt %) | Average particle size (μm) | Thickness (μm) Overall | Thickness (μm) Layer (B) | Apparent specific gravity | Average void percentage of film (vol %) |
|---|---|---|---|---|---|---|---|---|---|
| Ex. 1 | PETP | 75 | PETP | 95 | | 50 | 3 | 0.82 | 37 |
| | PS | 25 | R-TiO$_2$ | 5 | 0.3 | | | | |
| Ex. 2 | PETP | 80 | PETP | 95 | | 50 | 3 | 1.1 | 21 |
| | PS | 15 | R-TiO$_2$ | 5 | 0.3 | | | | |
| | A-TiO$_2$ | 5 | | | | | | | |
| Ex. 3 | PETP | 80 | PETP | 95 | | 50 | 3 | 1.1 | 21 |
| | PS | 15 | R-TiO$_2$ | 5 | 0.3 | | | | |
| | A-TiO$_2$ | 5 | | | | | | | |
| Ex. 4 | PETP | 80 | PETP | 95 | | 50 | 3 | 1.1 | 21 |
| | PS | 15 | R-TiO$_2$ | 5 | 0.3 | | | | |
| | A-TiO$_2$ | 5 | | | | | | | |
| Ex. 5 | PETP | 75 | PETP | 95 | | 50 | 3 | 0.82 | 37 |
| | PS | 25 | R-TiO$_2$ | 5 | 0.3 | | | | |
| Ex. 6 | PETP | 80 | PETP | 95 | | 50 | 3 | 1.1 | 21 |
| | PS | 15 | R-TiO$_2$ | 5 | 0.3 | | | | |
| | A-TiO$_2$ | 5 | | | | | | | |

PETP: Polyethylene terephthalate
PS: General-purpose polystyrene
R-TiO$_2$: Rutile-type titanium dioxide
A-TiO$_2$: Anatase-type titanium dioxide

TABLE 2

| Ex. No. | Void percentage of surface portion (vol %) | Initial modulus (kg/mm$^2$) MD | Initial modulus (kg/mm$^2$) TD | Thermal shrinkage factor (%) MD | Thermal shrinkage factor (%) TD | Light transmittance (%) | Surface strength 18 mm | Surface strength 9 mm | Stack-writing property | Whiteness | Surface roughness (μm) |
|---|---|---|---|---|---|---|---|---|---|---|---|
| Ex. 1 | 7 | 300 | 300 | 1.8 | 1 | 18.0 | 1 | 3 | good | 75.0 | 0.25 |
| Ex. 2 | 2 | 330 | 310 | 1.2 | 0.6 | 15.5 | 1 | 2 | good | 79.0 | 0.2 |
| Ex. 3 | 1 | 330 | 310 | 1.2 | 0.6 | 17.0 | 1 | 2 | good | 82.0 | 0.2 |
| Ex. 4 | 2 | 330 | 310 | 1.2 | 0.6 | 13.0 | 1 | 2 | good | 82.0 | 0.2 |
| Ex. 5 | 7 | 300 | 300 | 1.8 | 1 | 18.0 | 1 | 3 | good | 75.0 | 0.35 |
| Ex. 6 | 2 | 330 | 310 | 1.2 | 0.6 | 13.0 | 1 | 1 | good | 82.0 | 0.2 |

TABLE 3

| Ex. No. | Polyester base layer (A) Ingredients | Amounts (wt %) | Outer surface layer (B) Ingredients | Amounts (wt %) | Average particle size (μm) | Thickness (μm) Overall | Thickness (μm) Layer (B) | Distribution of inorganic particles in layer (B) $R_1$ | $R_2$ | 99% $R_2$ | $R_n$ | Apparent specific gravity |
|---|---|---|---|---|---|---|---|---|---|---|---|---|
| Ex. 7 | PETP PS A-TiO$_2$ | 80 15 5 | PETP R-TiO$_2$ | 95 5 | 0.3 | 50 | 4 | 0.25 | 0.27 | 0.7 | 1 | 1.1 |
| Ex. 8 | PETP PS A-TiO$_2$ | 80 15 5 | PETP R-TiO$_2$ | 95 5 | 0.3 | 50 | 4 | 0.25 | 0.27 | 0.7 | 1 | 1.1 |
| Ex. 9 | PETP PS A-TiO$_2$ | 80 15 5 | PETP R-TiO$_2$ | 95 5 | 0.3 | 50 | 4 | 0.25 | 0.27 | 0.7 | 1 | 1.1 |

PETP: Polyethylene terephthalate
PS: General-purpose polystyrene
R-TiO$_2$: Rutile-type titanium dioxide
A-TiO$_2$: Anatase-type titanium dioxide

TABLE 4

| Ex. No. | Initial modulus (kg/mm$^2$) MD | TD | Thermal shrinkage factor (%) MD | TD | Light transmittance (%) | Stack-writing property | Whiteness | Surface roughness (μm) |
|---|---|---|---|---|---|---|---|---|
| Ex. 7 | 330 | 310 | 1.2 | 0.6 | 13.0 ± 0.6 | poor | 82.0 ± 1.5 | 0.2 |
| Ex. 8 | 330 | 310 | 1.2 | 0.6 | 18.5 ± 0.8 | poor | 82.0 ± 1.5 | 0.2 |
| Ex. 9 | 320 | 290 | 1.2 | 0.6 | 15.0 ± 2.0 | poor | 80.0 ± 3.0 | 0.2 |

TABLE 5

| Ex. No. | Polyester base layer (A) Ingredients | Amounts (wt %) | Outer surface layer (B) Ingredients | Amounts (wt %) | Average particle size (μm) | Thickness (μm) Overall | Layer (B) | Distribution of inorganic particles in layer (B) $R_1$ | $R_2$ | 99% $R_2$ | $R_n$ | Apparent specific gravity | Average void percentage of film (vol %) |
|---|---|---|---|---|---|---|---|---|---|---|---|---|---|
| Ex. 10 | PETP PS | 75 25 | PETP R-TiO$_2$ | 95 5 | 0.3 | 50 | 3 | 0.25 | 0.27 | 0.7 | 1 | 0.82 | 37 |
| Ex. 11 | PETP PS A-TiO$_2$ | 80 15 5 | PETP R-TiO$_2$ | 95 5 | 0.3 | 50 | 3 | 0.25 | 0.27 | 0.7 | 1 | 1.1 | 21 |
| Ex. 12 | PETP PS A-TiO$_2$ | 80 15 5 | PETP R-TiO$_2$ | 95 5 | 0.3 | 50 | 3 | 0.25 | 0.27 | 0.7 | 1 | 1.1 | 21 |
| Ex. 13 | PETP PS A-TiO$_2$ | 80 15 5 | PETP R-TiO$_2$ | 90 10 | 0.3 | 50 | 3 | 0.25 | 0.28 | 0.72 | 0.95 | 1.11 | 21 |
| Comp. Ex. 1 | PETP PS A-TiO$_2$ | 80 15 5 | | | | 50 | | | | | | 1.0 | 21 |
| Comp. Ex. 2 | PETP PS A-TiO$_2$ | 80 15 5 | PETP R-TiO$_2$ | 95 5 | 0.3 | 50 | 3 | 0.25 | 0.28 | 0.72 | 1 | 1.1 | 21 |
| Comp. Ex. 3 | PETP A-TiO$_2$ | 95 5 | PETP R-TiO$_2$ | 95 5 | 0.3 | 50 | 3 | 0.25 | 0.28 | 0.72 | 1 | 1.45 | 0 |
| Ex. 14 | PETP PS A-TiO$_2$ | 80 15 5 | PETP CaCO$_3$ | 95 5 | 0.6 | 50 | 3 | 0.6 | 0.65 | 1.25 | 1.21 | 1.11 | 21 |
| Ex. 15 | PETP PS A-TiO$_2$ | 80 15 5 | PETP CaCO$_3$ | 95 5 | 1 | 50 | 3 | 1 | 1.24 | 2.05 | 1.42 | 1.1 | 21 |

PETP: Polyethylene terephthalate
PS: General-purpose polystyrene
R-TiO$_2$: Rutile-type titanium dioxide
A-TiO$_2$: Anatase-type titanium dioxide

TABLE 6

| Ex. No. | Void percentage of surface portion (vol %) | Initial modulus (kg/mm$^2$) MD | TD | Thermal shrinkage factor (%) MD | TD | Light transmittance (%) | Surface strength 18 mm | 9 mm | Stack-writing property | Whiteness | Surface roughness (μm) | Surface glossiness |
|---|---|---|---|---|---|---|---|---|---|---|---|---|
| Ex. 10 | 7 | 300 | 300 | 1.8 | 1 | 18.0 ± 0.6 | 1 | 3 | good | 75.0 ± 1.2 | 0.25 | |
| Ex. 11 | 2 | 330 | 310 | 1.2 | 0.6 | 13.0 ± 0.6 | 1 | 2 | good | 82.0 ± 1.5 | 0.2 | |
| Ex. 12 | 2 | 330 | 310 | 1.2 | 0.6 | 13.0 ± 0.6 | 1 | 1 | good | 82.0 ± 1.5 | 0.2 | |
| Ex. 13 | 2 | 330 | 310 | 1.2 | 0.6 | 10.0 ± 0.4 | 1 | 1 | good | 90.0 ± 1.5 | 0.28 | |
| Comp. | 2 | 310 | 300 | 1.2 | 0.6 | 13.0 ± 0.9 | 2 | 3 | good | 79.0 ± 0.8 | 0.25 | |

TABLE 6-continued

| Ex. No. | Void percentage of surface portion (vol %) | Initial modulus (kg/mm²) MD | Initial modulus (kg/mm²) TD | Thermal shrinkage factor (%) MD | Thermal shrinkage factor (%) TD | Light transmittance (%) | Surface strength 18 mm | Surface strength 9 mm | Stack-writing property | Whiteness | Surface roughness (μm) | Surface glossiness |
|---|---|---|---|---|---|---|---|---|---|---|---|---|
| Ex. 1 Comp. | | | | | | | | | | | | |
| Ex. 2 Comp. | 17 | 330 | 310 | 1.2 | 0.6 | 15.0 ± 2.0 | 2 | 3 | poor | 80.0 ± 5.0 | 0.2 | |
| Ex. 3 Comp. | 0 | 330 | 310 | 1.2 | 0.6 | 25.0 ± 2.0 | 1 | 1 | poor | 65.0 ± 2.0 | 0.08 | |
| Ex. 14 | 2 | 330 | 310 | 1.2 | 0.6 | 16.5 ± 0.6 | 1 | 1 | good | 80.0 ± 0.8 | 0.3 | good |
| Ex. 15 | 2 | 330 | 310 | 1.2 | 0.6 | 15.0 ± 0.8 | 1 | 1 | good | 82.0 ± 1.5 | 0.2 | good |

TABLE 7

| Ex. No | Polyester base layer (A) Ingredients | Amounts (wt %) | Outer surface layer (B) Ingredients | Amounts (wt %) | Average particle size (μm) | Thickness (μm) Overall | Thickness (μm) Layer (B) | Apparent specific gravity | Average void percentage of film (vol %) |
|---|---|---|---|---|---|---|---|---|---|
| Ex. 16 | PETP<br>PS<br>A-TiO₂ | 80<br>15<br>5 | PETP<br>Zeolite | 98<br>2 | 1.5 | 38 | 3<br>(2 layers) | 1.08 | 22 |
| Ex. 17 | PETP<br>PS<br>A-TiO₂ | 80<br>15<br>5 | PETP<br>Zeolite | 93<br>7 | 3.3 | 50 | 4 | 1.11 | 21 |
| Ex. 18 | PETP<br>PS<br>A-TiO₂ | 80<br>15<br>5 | PETP<br>Zeolite<br>R-TiO₂ | 93<br>4<br>3 | 1.5<br>0.3 | 50 | 5<br>(2 layers) | 1.1 | 23 |

PETP: Polyethylene terephthalate
PS: General-purpose polystyrene
R-TiO₂: Rutile-type titanium dioxide
A-TiO₂: Anatase-type titanium dioxide

TABLE 8

| Ex. No. | Void percentage of surface portion (vol %) | Surface strength 18 mm | Stack-writing property | Surface glossiness |
|---|---|---|---|---|
| Ex. 16 | 2 | 1 | good | excellent |
| Ex. 17 | 2 | 1 | good | excellent |
| Ex. 18 | 2 | 1 | good | excellent |

TABLE 9

| Ex. No. | Polyester base layer (A) Ingredients | Amounts (wt %) | Outer surface layer (B) Ingredients | Amounts (wt %) | Average particle size (μm) | Thickness (μm) Overall | Thickness (μm) Layer (B) | Distribution of inorganic particles in layer (B) R₁ | R₂ | 99% R₂ | Rₙ | Apparent specific gravity | Average void percentage of film (vol %) |
|---|---|---|---|---|---|---|---|---|---|---|---|---|---|
| Ex. 19 | PETP<br>PS<br>A-TiO₂ | 80<br>15<br>5 | PETP<br>A-TiO₂ | 95<br>5 | 0.3 | 50 | 3 | 0.25 | 0.28 | 0.72 | 1 | 1.1 | 21 |
| Ex. 20 | PETP<br>PS<br>A-TiO₂ | 80<br>15<br>5 | PETP<br>R-TiO₂ | 95<br>5 | 0.3 | 50 | 3 | 0.25 | 0.28 | 0.72 | 1 | 1.1 | 21 |
| Ex. 21 | PETP<br>PS<br>A-TiO₂ | 80<br>15<br>5 | PETP<br>R-TiO₂<br>(SiO₂-treated) | 95<br>5 | 0.3 | 50 | 3 | 0.25 | 0.28 | 0.72 | 1 | 1.1 | 21 |
| Ex. 22 | PETP<br>PS<br>A-TiO₂ | 80<br>15<br>5 | PETP<br>R-TiO₂<br>(Al₂O₃-treated) | 95<br>5 | 0.3 | 50 | 3 | 0.25 | 0.28 | 0.72 | 1 | 1.1 | 21 |

PETP: Polyethylene terephthalate
PS: General-purpose polystyrene
R-TiO₂: Rutile-type titanium dioxide
A-TiO₂: Anatase-type titanium dioxide

TABLE 10

| Ex. No. | Void percentage of surface portion (vol %) | Initial modulus (kg/mm²) MD | Initial modulus (kg/mm²) TD | Thermal shrinkage factor (%) MD | Thermal shrinkage factor (%) TD | Light transmittance (%) | Surface strength 18 mm | Surface strength 9 mm | Stack-writing property | Whiteness | Surface roughness (μm) | Yellowing factor |
|---|---|---|---|---|---|---|---|---|---|---|---|---|
| Ex. 19 | 2 | 330 | 310 | 1.2 | 0.6 | 13 ± 0.6 | 1 | 1 | good | 82 ± 1.5 | 0.2 | 2.2 |
| Ex. 20 | 2 | 330 | 310 | 1.2 | 0.6 | 13 ± 0.6 | 1 | 1 | good | 82 ± 1.5 | 0.2 | 1.7 |

TABLE 10-continued

| Ex. No. | Void percentage of surface portion (vol %) | Initial modulus (kg/mm$^2$) MD | Initial modulus (kg/mm$^2$) TD | Thermal shrinkage factor (%) MD | Thermal shrinkage factor (%) TD | Light transmittance (%) | Surface strength 18 mm | Surface strength 9 mm | Stack-writing property | Whiteness | Surface roughness (μm) | Yellowing factor |
|---|---|---|---|---|---|---|---|---|---|---|---|---|
| Ex. 21 | 2 | 330 | 310 | 1.2 | 0.6 | 13 ± 0.6 | 1 | 1 | good | 82 ± 1.5 | 0.2 | 1.5 |
| Ex. 22 | 2 | 330 | 310 | 1.2 | 0.6 | 13 ± 0.6 | 1 | 1 | good | 82 ± 1.5 | 0.2 | 1.3 |

What is claimed is:

1. A void-containing composite film comprising (A) a polyester base layer containing voids comprising a polymer mixture of a polyester and a thermoplastic resin which is not compatible with the polyester and is selected from the group consisting of polystyrene resins, polyolefin resins, polyacrylic resins, polycarbonate resins, polysulfone resins, cellulose resins, polysiloxane resins and silicone resins, and (B) at least one outer surface layer composed mainly of polyethylene terephthalate and formed on at least one side of the polyester base layer (A), said polyester base layer (A) and said at least one outer surface layer (B) being formed into a composite film by co-extrusion, followed by orientation in at least one direction, wherein the void percentage of a surface portion having 3 μm thickness from the surface of the polyester base layer (A) is 8% by volume or less, the average void percentage of the composite film is 10% to 50% by volume, and the composite film has substantially no voids at the interface between the polyester base layer (A) and the outer surface layer (B).

2. A void-containing composite film according to claim 1, wherein the average void percentage of the composite film is 10% to 35% by volume.

3. A void-containing composite film according to claim 1, wherein the outer surface layer (B) contains inorganic particles in an amount of 0.5% to 30% by weight.

4. A void-containing composite film according to claim 3, wherein the polyester base layer (A) contains inorganic particles, in an amount of 1% to 20% by weight, having an average particle size smaller than that of the inorganic particles contained in the outer surface layer (B).

5. A void-containing composite film according to claim 4, wherein the inorganic particles in the polyester base layer (A) are present in the thermoplastic resin which is not compatible with the polyester.

6. A void-containing composite film according to claim 3, wherein the relationship between the height Y (in μm) of the peaks of the inorganic particles, based on the height of the peaks giving the maximum number of the peaks in the surface portion of the outer surface layer (B) where the number of the peaks is 50 mm$^{-2}$ or more, and the number X (in mm$^{-2}$) of the peaks of the inorganic particles in the surface portion, meets the following inequality:

$$-1.3 \log X + 5.2 \geq -0.77 \log X + 2.31 \quad (1)$$

wherein $X \geq 50$ and $Y \geq 0$.

7. A void-containing composite film according to claim 3, wherein the inorganic particles are rutile titanium dioxide particles.

8. A void-containing composite film according to claim 7, wherein the inorganic particles are surface-treated particles of rutile titanium dioxide.

9. A void-containing composite film according to claim 8, wherein the particles of rutile titanium dioxide are surface-treated with aluminum oxide.

10. A void-containing composite film of the polyester according to claim 1, wherein the outer surface layer (B) contains at least one kind of particles having an average particle size of 0.3 μm or greater and having a spherical or cubic shape, or an intermediate shape therebetween, with notched irregularities on the surface thereof, at a proportion of 1% by weight or more in total.

11. A void-containing composite film according to claim 10, wherein the particles are composed of heat-treated synthetic zeolite.

12. A void-containing composite film according to claim 10, wherein the particles are composed of secondary aggregates of silica microbeads.

13. A void-containing composite film according to claim 10, wherein the particles are composed of secondary aggregates of calcium carbonate fine particles.

14. A void-containing composite film according to claim 10, wherein the particles are composed of secondary aggregates of titanium oxide fine particles.

15. An information-recording paper for use in sublimation transfer recording, thermal transfer recording, heat-sensitive transfer recording or ink-jet recording, made of a void-containing composite film according to claim 1.

16. A photographic printing paper made of a void-containing composite film according to claim 1.

17. A void-containing composite film comprising (A) a polyester base layer containing voids and (B) at least one outer surface layer composed mainly of a thermoplastic resin and formed on at least one side of the polyester base layer (A), wherein the outer surface layer (B) contains 1% to 30% by weight of inorganic particles comprising primary particles having an average primary particle size $R_1$ of 0.1 to 2.0 μm and secondary particles having an average secondary particle size $R_2$ which is 1.05 to 1.60 times the value of $R_1$; a particular particle size of the secondary particles giving 99% probability in the normal distribution for the presence of secondary particles smaller than the particular particle size is not greater than 4.0 times the value of $R_1$; and the average value of the shortest distances between the centers of gravity for the inorganic particles is not greater than 5.0 times the value of $R_1$.

18. A void-containing composite film according to claim 17, wherein the outer surface layer (B) contains at least one kind of particles having an average particle size of 0.8 μm or greater and having a spherical or cubic shape, or an intermediate shape therebetween, with notched irregularities on the surface thereof, at a proportion of 1% by weight or more in total.

19. A void-containing composite film according to claim 18, wherein the particles are composed of heat-treated synthetic zeolite.

20. A void-containing composite film according to claim 18, wherein the particles are composed of secondary aggregates of silica microbeads.

21. A void-containing composite film according to claim 18, wherein the particles are composed of secondary aggregates of calcium carbonate fine particles.

22. A void-containing composite film according to claim 18, wherein the particles are composed of secondary aggregates of titanium oxide fine particles.

23. A void-containing composite film according to claim 18, wherein the particles are rutile titanium dioxide particles.

24. A void-containing composite film according to claim 17, wherein the inorganic particles are surface-treated particles of rutile titanium dioxide.

25. A void-containing composite film according to claim 24, wherein the particles of rutile titanium dioxide are surface-treated with aluminum oxide.

26. A void-containing composite film according to claim 17, wherein the inorganic particles in the polyester base layer (A) contains inorganic particles in an amount of 1% to 20% by weight and these inorganic particles are present in the thermoplastic resin which is not compatible with the polyester.

27. An information-recording paper for use in sublimation transfer recording, thermal transfer recording, heat-sensitive transfer recording or ink-jet recording, made of a void-containing composite film according to claim 17.

28. A photographic printing paper made of a void-containing composite film according to claim 17.

* * * * *